United States Patent [19]

Rempel et al.

[11] Patent Number: 5,208,296
[45] Date of Patent: May 4, 1993

[54] NITRILE RUBBER HYDROGENATION

[75] Inventors: Garry L. Rempel; Xiang-Yao Guo, both of Waterloo, Canada

[73] Assignee: Polysar Rubber Corporation, Sarnia, Ontario, Canada

[21] Appl. No.: 939,245

[22] Filed: Sep. 2, 1992

[51] Int. Cl.$^5$ ............................................. C08F 8/04
[52] U.S. Cl. ................................. 525/338; 525/329.3; 525/339
[58] Field of Search ............................ 525/338, 339

[56] References Cited

U.S. PATENT DOCUMENTS

| | | |
|---|---|---|
| 3,700,637 | 10/1972 | Finch .................... 260/83.3 |
| 4,384,081 | 5/1983 | Kubo et al. ............ 525/339 |
| 4,464,515 | 8/1984 | Rempel et al. ........ 525/338 |
| 4,503,196 | 3/1985 | Rempel et al. ........ 525/338 |
| 4,631,315 | 12/1986 | Buding et al. ......... 525/338 |
| 4,812,528 | 3/1989 | Rempel et al. ........ 525/338 |
| 4,816,525 | 3/1989 | Rempel et al. ........ 525/338 |
| 4,876,314 | 10/1991 | Hoxmeier et al. ..... 525/338 |
| 5,034,469 | 7/1991 | Boding et al. ......... 525/338 |
| 5,057,581 | 10/1991 | Rempel et al. ........ 525/338 |
| 5,075,388 | 12/1991 | Rempel et al. ........ 525/338 |
| 5,164,457 | 11/1992 | Kubo et al. ........... 525/338 |

FOREIGN PATENT DOCUMENTS 1558491  1/1980  United Kingdom .

Primary Examiner—Bernard Lipman
Attorney, Agent, or Firm—Joseph C. Gil; Godfried R. Akorli

[57] ABSTRACT

An improved process is provided for the catalytic hydrogenation of nitrile rubber using a ruthenium catalyst wherein the improvement is that the nitrile rubber is provided as an aqueous emulsion and a solvent and a selected organic additive are present during the hydrogenation, whereby the molecular weight increase in the hydrogenation process is minimized and controlled.

10 Claims, No Drawings

NITRILE RUBBER HYDROGENATION

FIELD OF THE INVENTION

The present invention relates to an improved process for the production of hydrogenated nitrile rubber.

BACKGROUND OF THE INVENTION

It is well known that the carbon-carbon double bonds in a nitrile rubber, the nitrile rubber being a polymer comprising a $C_4$-$C_6$ conjugated diolefin and a $C_3$-$C_5$ unsaturated nitrile, can be selectively hydrogenated, without significant hydrogenation of the C≡N bonds, by treatment of the polymer with hydrogen in the presence of selected catalysts—for example, British Patent 1,558,491; U.S. Pat. Nos. 3,700,637; 4,384,081; 4,464,515; and 4,503,196. The use of ruthenium catalysts for the hydrogenation of nitrile rubbers is described in U.S. Pat. Nos. 4,631,315; 4,816,525, 4,812,528 and 5,057,581. The use of certain additives useful in the ruthenium catalysed hydrogenation of nitrile rubbers is described in U.S. Pat. No. 5,075,388.

In the hydrogenation of nitrile rubbers, it has been found that, depending on the nature of the catalyst, the solvent used in the hydrogenation process and the reaction conditions used for the hydrogenation, the molecular weight of the hydrogenated nitrile rubber increases during the hydrogenation process. The molecular weight increase is believed to be due to an interaction between two or more polymer molecules. The molecular weight increase is particularly noticeable when certain of the ruthenium catalysts are used and the interaction between polymer molecules can be such that the hydrogenated polymer contains gelled (crosslinked) or insoluble polymer. Although a slight increase in molecular weight can be tolerated, if the molecular weight of the hydrogenated polymer is too high this causes it to be of low acceptability to the purchaser who uses it to manufacture products, such as hoses, gaskets, belts, etc.

Accordingly, the present invention is directed to an improved process for the hydrogenation of nitrile-type polymers wherein the molecular weight increase in the hydrogenation process is minimized and controlled.

SUMMARY OF THE INVENTION

The present invention provides an improved process for the production of hydrogenated nitrile rubber wherein a nitrile rubber which is a polymer comprising a conjugated $C_4$-$C_6$ diolefin and a $C_3$-$C_5$ unsaturated nitrile is hydrogenated in the presence of a divalent ruthenium catalyst selected from compounds of the general formula:

$RuXY(CO)ZL_2$, or $RuDE(CO)M_n$, or $RuGJM_3$ or $RuK_2N_2$ wherein X is selected from a halogen atom or a carboxylate group, Y is selected from a halogen atom, a hydrogen atom, a phenyl group, a carboxylate group or a styryl group, Z is selected from CO, pyridine, benzonitrile or no ligand and L is selected from the phosphine ligands of the general formula $PR_3$ in which R is selected from alicyclic or alkyl groups, n is 2 or 3 and when n is 3 D is a halogen atom and E is a hydrogen atom and when n is 2 D is selected from a halogen atom or a carboxylate group, E is selected from a halogen atom, a hydrogen atom, a phenyl group or a carboxylate group, and M is selected from the phosphine ligands of the formula $PA_3$ in which A is a phenyl group or a $C_1$ to $C_4$ alkyl group or mixtures thereof, G is selected from a halogen atom or a hydrogen atom, J is selected from a halogen atom or a carboxylate group, K is a carboxylate group and N is a triphenylphosphine, the improvement being that said nitrile rubber is provided in an aqueous emulsion, an organic compound which is miscible with the aqueous phase and is also a solvent for the polymer and for the catalyst is added to said aqueous emulsion and an organic additive is added to the mixture before hydrogenation is initiated, said additive being selected from monocarboxylic acids of formula $R_1$—COOH, from dicarboxylic acids of formula HOOC—$R^1$—COOH and from tartaric, citric and ascorbic acids, wherein $R_1$ is selected from Q—$(CH_2)_m$— where m is an integer from 1 to 6 and Q is selected from hydroxy and phenoxy or $R_1$ is selected from T—C($CH_3$)$_2$—, T—$CH_2$—$(CH_2)_p$—, $T_2CH$—$(CH_2)_p$—, $T_3C$—$(CH_2)_p$—, 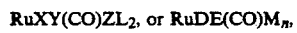, $CH_3$—$(CH_2)_y$—CHT—$(CH_2)_{p-1-y}$— or — where T is fluorine or chlorine, p is 0 or an integer from 1 to 5 and y is an integer from 1 to 3, or $R_1$ is selected from the aromatic group $C_6H_4Y$ where Y is selected from chlorine and hydroxy, and wherein $R^1$ is selected from —$(CH_2)_q$— where q is 0 or an integer from 1 to 5, from —CH=CH— and from (p)$C_6H_4$, the weight of said additive per 0.01 parts by weight of ruthenium in the catalyst being from about 0.3 to about 1.5.

DETAILED DESCRIPTION

The nitrile rubber hydrogenated in this invention is a polymer comprising a conjugated $C_4$-$C_6$ diolefin and a $C_3$-$C_5$ unsaturated nitrile. The conjugated $C_4$-$C_6$ diolefin is selected from butadiene, isoprene, piperylene and 2,3-dimethyl butadiene, with butadiene and isoprene being preferred and butadiene being most preferred. The conjugated diolefin forms from about 50 to about 85 per cent by weight of the polymer. The $C_3$-$C_5$ unsaturated nitrile is selected from acrylonitrile, methacrylonitrile and ethacrylonitrile, with acrylonitrile being most preferred, and forms from about 15 to about 50 per cent by weight of polymer. The polymer may also contain a small amount, that is from about 1 to about 10 per cent by weight of the polymer, of an unsaturated carboxylic acid selected from fumaric acid, maleic acid, acrylic acid and methacrylic acid which replaces part of the conjugated diolefin and the conjugated diolefin forms from about 40 to about 84 per cent by weight of the polymer. The nitrile rubber has a molecular weight, as expressed by the Mooney viscosity (ML 1+4 at 100° C.), of from about 25 to about 70. A preferred nitrile rubber is a butadiene-acrylonitrile polymer having an acrylonitrile content of from about 25 to about 45 per cent by weight and having a Mooney viscosity (ML 1+4 at 100° C.) of from about 25 to about 60.

Nitrile rubber is usually prepared by aqueous emulsion free radical polymerization of the monomers, the direct product of the polymerization being an aqueous emulsion of nitrile rubber. This emulsion generally contains from about 15 to about 45 weight per cent of nitrile rubber. The nitrile rubber aqueous emulsion used in this invention thus contains from about 15 to about 45, preferably from about 28 to about 38, weight per cent of nitrile rubber, the balance being water, emulsifiers and minor proportions of other materials used in the polymerization.

The organic compound used in the invention is one which is miscible with the aqueous phase and which is also a solvent for the polymer and for the catalyst. Suitable such compounds include acetone, methylethylketone, tetrahydrofuran, methyltetrahydrofuran, cyclohexanone and the like; methylethylketone, acetone and tetrahydrofuran are preferred. The amount of such compound that is added to the nitrile rubber emulsion is from about 30 to about 5, preferably from about 15 to about 7, parts by weight per 1 part by weight of nitrile rubber in the emulsion.

Hydrogen is provided as essentially pure dry gas at a pressure of from about 25 kg/cm$^2$ (355 psi) to about 100 kg/cm$^2$ (1420 psi).

The hydrogenation reaction is undertaken in a suitable reaction vessel equipped with a temperature regulating means and an agitator. The nitrile rubber emulsion and the organic compound are added to the reaction vessel, the organic additive is added, any necessary degassing is undertaken, and either the catalyst is added followed by pressurizing with hydrogen or the vessel is pressurized with hydrogen and the catalyst is added. The catalyst may be added as the solid material or as a solution in an appropriate solvent. The exact order of addition is not critical. The reactor is heated to the desired temperature. The temperature for the hydrogenation is from about 80° to about 200° C., preferably from about 120° C. to about 180° C. Hydrogen may be added to the reactor during the hydrogenation and the reaction is complete within about 1 to about 24 hours, although when the preferred catalysts are used the reaction time is generally from about 2 to about 8 hours The degree of hydrogenation may be controlled by control of one or more of the reaction time, temperature or hydrogen pressure, preferably reaction time. On completion of the reaction, the reaction vessel is vented and the polymer recovered by contact with hot water/steam or an alcohol followed by drying.

The divalent ruthenium catalyst used in the process is selected from compounds of the general formula $$\text{RuXY(CO)ZL}_2, \text{ or RuDE(CO)M}_n, \text{ or RuGJM}_3 \text{ or RuK}_2\text{N}_2$$

wherein X is selected from a halogen atom or a carboxylate group, preferably is a halogen atom and most preferably is chlorine; Y is selected from a halogen atom, a hydrogen atom, a phenyl group, a carboxylate group or a styryl group, preferably is a chlorine atom or a hydrogen atom and most preferably is a hydrogen atom; Z is selected from CO, pyridine, benzonitrile or no ligand; L is selected from phosphine ligands of the general formula PR$_3$ wherein R is selected from alicyclic or alkyl groups. For R$_1$, a preferred alicyclic group is cyclohexyl and the alkyl group is preferably selected from isopropyl and secondary butyl and from tertiary butyl when combined with a smaller alkyl group. Most preferably R is cyclohexyl. n is 2 or 3 and when n is 3 D is a halogen atom and E is a hydrogen atom and when n is 2 D is selected from a halogen atom or a carboxylate group, E is selected from a halogen atom, a hydrogen atom, a phenyl group or a carboxylate group, preferably a halogen atom or a hydrogen atom; M is selected from the phosphine ligands of formula PA$_3$ in which A is a phenyl group or a C$_1$ to C$_4$ alkyl group or mixtures thereof; G is selected from a halogen atom or a hydrogen atom; J is selected from a halogen atom or a carboxylate group; K is a carboxylate group and N is triphenylphosphine.

Specific examples of suitable divalent ruthenium catalysts include carbonylchlorohydrido bis (tricyclohexylphosphine) ruthenium (II), carbonylchloro styryl bis(tricyclohexylphosphine) ruthenium (II), carbonylchlorostyryl bis(tri-isopropylphosphine) ruthenium (II), carbonylchlorohydrido bis (triisopropylphosphine) ruthenium (II), carbonylchloro benzoato bis(triphenylphosphine) ruthenium (II), carbonylchlorohydrido tris (triphenylphosphine) ruthenium (II), and dichloro tris (triphenylphosphine) ruthenium (II). Preferred among these are carbonylchlorohydrido bis(tricyclohexylphosphine) ruthenium (II) and carbonylchlorostyryl bis(tricyclohexylphosphine) ruthenium (II).

The concentration of the ruthenium catalyst is not critical and usually is within the range of from about 0.1 to about 2 per cent by weight of the nitrile rubber. For economic reasons it is desirable to minimize the concentration of the ruthenium catalyst and accordingly it is preferably used within the range of from about 0.1 to about 0.25 per cent by weight of the nitrile rubber.

The improved process of this invention requires the presence, during the hydrogenation, of an organic additive selected from monocarboxylic acids of formula R$_1$—COOH, from dicarboxylic acids of formula HOOC—R$^1$—COOH and from tartaric, citric and ascorbic acids, wherein R$_1$ is selected from Q—(CH$_2$)$_m$— where m is an integer from 1 to 6 and Q is selected from hydroxy and phenoxy or R$_1$ is selected from T—C(CH$_3$)$_2$—, T—CH$_2$—(CH$_2$)$_p$—,  T$_2$CH—(CH$_2$)$_p$—, T$_3$C—(CH$_2$)$_p$, CH$_3$—CHT—(CH$_2$)$_{p-1}$—, CH$_3$—(CH$_2$)$_y$—CHT—(CH$_2$)$_{p-1-y}$—, or CH$_3$—(CH$_2$)$_{p-1}$—CHT— where T is fluorine or chlorine, p is 0 or an integer from 1 to 5 and y is an integer from 1 to 3, or R$_1$ is selected from the aromatic group C$_6$H$_4$Y where Y is selected from chlorine and hydroxy, and wherein R$^1$ is selected from —(CH$_2$)$_q$— where q is 0 or an integer from 1 to 5, from —CH=CH— and from (p)C$_6$H$_4$. The amount of such additive is from about 0.3 to about 1.5 parts by weight per 0.01 parts by weight of ruthenium in the catalyst. Suitable such additives include for compounds of formula R$_1$—COOH, chloroacetic acid, hydroxyacetic acid, phenoxyacetic acid, 3-chloropropionic acid, 4-chloro-butyric acid, 5-chloro-valeric acid and chlorobenzoic acid and for compounds of formula HOOC—R$^1$—COOH oxalic acid, malonic acid, succinic acid, adipic acid, suberic acid, fumaric acid and 1,4-phthalic acid. Preferred organic additives include the halogenated aliphatic acids such as chloroacetic acid, chloropropionic acid and trichloroacetic acid, and ascorbic acid. When the additive is present at the required concentration in the hydrogenation reaction, the extent of hydrogenation achieved, the time of reaction and the molecular weight of the hydrogenated nitrile rubber (as measured by the Mooney viscosity or the intrinsic viscosity) are all within the desired ranges whereas in the absence of the additive hydrogenation may either not occur or not reach the desired level or take too long or the hydrogenated nitrile rubber will have a significantly increased molecular weight or be crosslinked.

The molecular weight may be measured as the Mooney viscosity determined at 100° C. (ML 1+4 at 100° C.) or at 125° C. (ML 1+4 at 125° C.) or as the intrinsic viscosity determined at 35° C. in monochlorobenzene.

The following examples illustrate the scope of the invention and are not intended to limit the same.

EXAMPLES

EXAMPLE 1

A 300 ml glass lined stainless steel autoclave equipped with a temperature control means, an agitator, a catalyst addition means and a sampling means was used. 7 ml of a nitrile rubber emulsion (containing about 33 weight % of a nitrile rubber having an acrylonitrile content of about 38 weight %), 93 ml of methylethylketone (except as shown for Experiments #1, #6 and #7 in Table 1) and a quantity of the additive were added to the autoclave. A weighed quantity of carbonylchlorostyryl bis(tricyclohexyl-phosphine) ruthenium (II) was placed in the catalyst addition means, the autoclave was sealed and the assembled autoclave was then degassed by passing hydrogen through. The autoclave was heated to the reaction temperature, pressured with hydrogen to the desired pressure and the catalyst was transferred to the reaction mixture—hydrogen was added as necessary throughout the reaction to maintain the pressure constant. After the reaction was complete, the autoclave was de-pressured and vented and the reaction product was recovered, dried and evaluated, the data being shown in Table 1. In Table 1, the catalyst concentration is shown as the amount of ruthenium as parts per million (ppm) based on the weight of nitrile rubber. Additive A is chloroacetic acid, Additive B is hydroxyacetic acid, Additive C is phenoxyacetic acid, Additive D is 4-chloro-benzoic acid and Additive G is trichloro acetic acid. Intrinsic viscosities of the products of Experiments #2 and 4 were not measured. Experiments #5 and 6 are comparative in which Additive E is acetic acid and Additive F is 4-nitrobenzoic acid. The extent of hydrogenation was measured by infra red spectroscopy and the intrinsic viscosity was measured in chlorobenzene at 35° C. using an Ubbelohde viscometer. The additive ratio, shown as Add/0.01 g Ru, is the weight ratio of the additive per

TABLE 1

| EXPT. # | 1 | 2 | 3 | 4 | 5 | 6 | 7 |
|---|---|---|---|---|---|---|---|
| Wt. NBR (g) | 6.6 | 2.3 | 2.3 | 2.3 | 2.3 | 6.6 | 6.6 |
| Vol MEK (ml) | 100 | 93 | 93 | 93 | 93 | 100 | 100 |
| Ru (ppm) | 367 | 1054 | 1054 | 1054 | 1054 | 367 | 367 |
| $H_2$ press (psi) | 1000 | 1000 | 1000 | 1000 | 1200 | 1000 | 1000 |
| Additive | A | B | C | D | E | F | G |
| Add. Wt. (g) | 0.2 | 0.1 | 0.1 | 0.2 | 0.1 | 0.2 | 0.2 |
| React. time (hr) | <3 | 1.5 | 5 | 5 | 2.5 | 3 | 4.5 |
| Hydrog. (%) | 99 | 99 | 98.5 | 94 | 90 | 97 | 97 |
| Int. Vis. (dl/g) | 1.55 | — | 1.81 | — | — | — | 1.5 |
| Add/0.01 g Ru | 0.82 | 0.41 | 0.41 | 0.82 | 0.41 | 0.82 | 0.82 |

TABLE 2

| EXPT. # | 1 | 2 | 3 | 4 |
|---|---|---|---|---|
| Wt. NBR (g) | 2.3 | 2.3 | 2.3 | 6.6 |
| Vol MEK (ml) | 93 | 93 | 93 | 100 |
| Ru (ppm) | 958 | 958 | 958 | 240 |
| $H_2$ press (psi) | 1200 | 1200 | 1200 | 1200 |
| Add. Wt. (g) | 0 | 0.16 | 0 | 0.24 |
| React. time (hr) | 0.5 | 4.3 | 1 | 2.1 |
| Hydrog. (%) | 98 | 91 | 0 | 97 |
| Int. Vis. (dl/g) | — | 1.5 | — | 1.52 |
| Add/0.01 g Ru | — | 0.72 | — | 1.51 |
| Cat. Type | I | I | II | II |

TABLE 3

| EXPT. # | 1 | 2 | 3 | 4 | 5 |
|---|---|---|---|---|---|
| Wt. NBR (g) | 6.6 | 6.6 | 6.6 | 6.6 | 6.6 |
| Vol MEK (ml) | 100 | 100 | 100 | 100 | 100 |
| Ru (ppm) | 367 | 367 | 367 | 229 | 367 |
| $H_2$ press (psi) | 1000 | 1000 | 1000 | 1000 | 1000 |
| Additive | A | N | P | P | Q |
| Add. Wt. (g) | 0.2 | 0.23 | 0.25 | 0.25 | 0.28 |
| React. time (hr) | <3 | <2.3 | <2.5 | <2.8 | <2.0 |
| Hydrog. (%) | 99 | 99 | 99 | 99 | 99 |
| Add/0.01 g Ru | 0.82 | 0.94 | 1.02 | 1.65 | 1.16 |
| Int. Visc. (dl/g) | 1.55 | 1.54 | 1.57 | — | 1.62 |

0.01 g of ruthenium in the catalyst. The effectiveness of the additives is clear and for the comparative experiments #5 and 6, the reaction product was crosslinked whereas the other products were soluble.

EXAMPLE 2

Two other ruthenium catalysts were used with ascorbic acid as the additive the data being shown in Table 2. Catalyst I was dichloro bis(triphenylphosphine) ruthenium (II) and Catalyst II was carbonylchlorohydrido bis(tricyclohexylphosphine) ruthenium (II). Experiments #1 and 3 are controls with no additive present and for experiment #1 the reaction product was crosslinked whereas for experiment #3 no hydrogenation occurred.

EXAMPLE 3

Table 3 records the data for the evaluation of various chloro-carboxylic acids using carbonylchlorostyryl bis(tricyclohexylphosphine) ruthenium (II) as the catalyst. Additive A is chloroacetic acid, Additive N is 3-chloro-propionic acid, Additive P is 4-chloro-butyric acid and Additive Q is 5-chloro-valeric acid. The effectiveness of these additives is clearly shown.

EXAMPLE 4

In Table 4 is recorded the data for the use of Additive M which is ascrobic acid and for Additive R which is citric acid when carbonylchlorostyryl bis(tricyclohexylphosphine) ruthenium (II) is used as the hydrogenation catalyst.

TABLE 4

| EXPT. # | 1 | 2 | 3 |
|---|---|---|---|
| Wt. NBR (g) | 10 | 2.3 | 6.6 |
| Vol MEK (ml) | 100 | 93 | 100 |
| Ru (ppm) | 240 | 1054 | 367 |
| $H_2$ press (psi) | 1200 | 1000 | 1200 |
| Additive | M | R | R |
| Add. Wt. (g) | 0.33 | 0.2 | 0.33 |
| React. time (hr) | 6 | <1.5 | <4 |
| Hydrog. (%) | 97 | 99 | 99 |
| Int. Visc. (dl/g) | 1.63 | 1.76 | 1.68 |
| Add/0.01 g Ru | 1.38 | 0.82 | 1.38 |

EXAMPLE 5

Using the procedure of Example 1 and carbonylchlorostyry bis(tricyclohexylphosphine) ruthenium (II) as the catalyst, various dicarboxylic acids were evaluated as shown in Table 5. Additive S is oxalic acid, Additive T is succinic acid, Additive U is adipic acid, Additive V is suberic acid, Additive W is sebacic acid and is included as a comparative additive, Additive X is fumaric acid and Additive Y is 1,4-phthalic acid. When no additive was present, no hydrogenation had occurred in one hour of reaction. For Experiments #2 and

TABLE 5

| EXPT # | 1 | 2 | 3 | 4 | 5 | 6 | 7 |
|---|---|---|---|---|---|---|---|
| Wt. NRR (g) | 2.3 | 6.6 | 2.3 | 2.3 | 2.3 | 2.3 | 6.6 |
| Vol. MEK (ml) | 93 | 100 | 90 | 93 | 93 | 93 | 100 |
| Ru (ppm) | 1054 | 367 | 1054 | 1054 | 1054 | 1054 | 367 |
| $H_2$ press (psi) | 1200 | 1000 | 1200 | 1200 | 1200 | 1200 | 1000 |
| Additive | S | T | U | V | W | X | Y |
| Add. wt. (g) | 0.2 | 0.2 | 0.2 | 0.2 | 0.2 | 0.1 | 0.2 |
| React time (hr) | >10 | 2.7 | 2 | 9.2 | 4.5 | <1.5 | 3.7 |
| Hydrog. (%) | 99 | 99 | 99 | 96 | 80 | 99 | 98 |
| Int Visc (dl/g) | 1.63 | 1.68 | — | — | — | — | 1.7 |
| Add/0.01 g Ru | 0.82 | 0.82 | 0.82 | 0.82 | 0.82 | 0.41 | 0.82 |

7, the temperature was increased to 180° C. for the last 0.5 hour of the hydrogenation reaction.

What is claimed is:

1. An improved process for the production of hydrogenated nitrile rubber wherein a nitrile rubber which is a polymer comprising a conjugated $C_4$-$C_6$ diolefin and a $C_3$-$C_5$ unsaturated nitrile is hydrogenated in the presence of a divalent ruthenium catalyst selected from compounds of the general formula:

wherein X is selected from a halogen atom or a carboxylate group, Y is selected from a halogen atom, a hydrogen atom, a phenyl group, a carboxylate group or a styryl group, Z is selected from CO, pyridine., benzonitrile or no ligand and L is selected from the phosphine ligands of the general formula $PR_3$ in which R is selected from alicyclic or alkyl groups, n is 2 or 3 and when n is 3, D is a halogen atom and E is a hydrogen atom and when n is 2, D is selected from a halogen atom or a carboxylate group and E is selected from a halogen atom, a hydrogen atom a phenyl group or a carboxylate group and M is selected from the phosphine ligands of the formula $PA_3$ in which A is a phenyl group or a $C_1$ to $C_4$ alkyl group or mixtures thereof, G is selected from a halogen atom or a hydrogen atom, J is selected from a halogen atom or a carboxylate group, K is a carboxylate group and N is triphenylphosphine, the improvement being that said nitrile rubber is provided in an aqueous emulsion, an organic compound which is miscible with the aqueous phase and is also a solvent for the polymer and for the catalyst is added to said aqueous emulsion and an organic additive is added to the mixture before hydrogenation is initiated, said additive being selected from monocarboxylic acids of formula $R_1$—COOH, from dicarboxylic acids of formula HOOC—$R^1$—COOH and from tartaric, citric and ascorbic acids, where $R_1$ is selected from Q—$(CH_2)_m$— where m is an integer from 1 to 6 and Q is selected from hydroxy and phenoxy or $R_1$ is selected from T—$C(CH_3)_2$—, T—$CH_2$—$(CH_2)_p$—, $T_2CH$—$(CH_2)_p$—, $T_3C$—$(CH_2)_p$—, $CH_3$—CHT—$(CH_2)_{p-1}$—, $CH_3$—$(CH_2)_y$—CHT—$(CH_2)_{p-1-y}$—, or $CH_3$—$(CH_2)_{p-1}$—CHT— where T is fluorine or chlorine, p is 0 or an integer from 1 to 5 and y is an integer from 1 to 3, or $R_1$ is selected from the aromatic group $C_6H_4Y$ where Y is selected from chlorine and hydroxy, and wherein $R^1$ is selected from —$(CH_2)_q$— where q is 0 or an integer from 1 to 5, from —CH=CH— and from (p) $C_6H_4$, the weight of said additive per 0.01 parts by weight of ruthenium in the catalyst being from about 0.3 to about 1.5.

2. The process of claim 1 wherein the organic additive is a monocarboxylic acid selected from chloroacetic acid, hydroxyacetic acid, phenoxyacetic acid, 3-chloro-propionic acid, 4-chloro-butyric acid, 5-chlorovaleric acid and chlorobenzoic acid.

3. The process of claim 1 wherein the organic additive is a dicarboxylic acid selected from oxalic acid, malonic acid, succinic acid, adipic acid, fumaric acid and 1,4-phthalic acid.

4. The process of claim 1 wherein the organic additive is chloroacetic acid.

5. The process of claim 1 wherein the organic additive is selected from ascorbic acid and citric acid.

6. The process of claim 1 wherein the organic compound is selected from acetone, methylethylketone and tetrahydrofuran.

7. The process of claim 1 wherein the aqueous nitrile rubber emulsion contains from about 15 to about 45 weight per cent of nitrile rubber which comprises from about 50 to about 85 weight per cent of a $C_4$-$C_6$ conjugated diolefin and from about 15 to about 50 weight per cent of a $C_3$-$C_5$ unsaturated nitrile and the amount of the organic compound is from about 30 to about 5 parts by weight per 1 part by weight of nitrile rubber in the emulsion.

8. The process of claim 1 wherein the hydrogenation reaction is at a temperature of from about 80° to about 200° C. for a time of from about 1 to about 24 hours and the concentration of the ruthenium catalyst is from about 0.1 to about 2 per cent by weight of the weight of nitrile rubber.

9. The process of claim 1 wherein the aqueous nitrile rubber emulsion contains from about 28 to about 38 weight per cent of nitrile rubber which comprises from about 75 to about 55 weight per cent of butadiene and from about 25 to about 45 weight per cent of acrylonitrile, the organic compound is selected from methylethylketone and tetrahydrofuran present at from about 15 to about 7 parts by weight per 1 part by weight of nitrile rubber, and the organic additive is selected from chloroacetic acid, 3-chloropropionic acid and ascorbic acid.

10. The process of claim 9 wherein the ruthenium catalyst is selected from the group consisting of carbonylchlorohydrido bis(tricyclohexylphosphine) ruthenium (II), carbonylchlorostyryl bis(tricyclohexylphosphine) ruthenium (II), carbonylchlorostyryl bis(tri-isopropylphosphine) ruthenium (II), carbonylchlorohydrido bis(triisopropylphosphine) ruthenium (II), carbonylchlorobenzoate bis(triphenylphosphine) ruthenium (II), carbonylchlorohydrido tris(triphenylphosphine) ruthenium (II) and dichloro tris(triphenylphosphine) ruthenium (II).

* * * * *